(12) United States Patent
Xu (10) Patent No.: US 12,515,158 B2
(45) Date of Patent: Jan. 6, 2026

(54) VAPOR-LIQUID CONTACTING APPARATUS AND PROCESS WITH DOWNCOMER AT SHELL

(71) Applicant: UOP LLC, Des Plaines, IL (US)

(72) Inventor: Zhanping Xu, Inverness, IL (US)

(73) Assignee: UOP LLC, Des Plaines, IL (US)

( * ) Notice: Subject to any disclaimer, the term of this patent is extended or adjusted under 35 U.S.C. 154(b) by 109 days.

(21) Appl. No.: 18/463,695

(22) Filed: Sep. 8, 2023

(65) Prior Publication Data
US 2023/0415083 A1   Dec. 28, 2023

Related U.S. Application Data (62) Division of application No. 15/940,895, filed on Mar. 29, 2018, now Pat. No. 11,786,855.

(51) Int. Cl.
| | | |
|---|---|---|
| *B01D 46/00* | (2022.01) | |
| *B01D 1/30* | (2006.01) | |
| *B01D 3/28* | (2006.01) | |
| *B01D 3/32* | (2006.01) | |
| *B01J 19/32* | (2006.01) | |

(52) U.S. Cl.
CPC ......... *B01D 46/0009* (2013.01); *B01D 1/305* (2013.01); *B01D 3/28* (2013.01); *B01D 3/326* (2013.01); *B01J 19/32* (2013.01); *B01J 2219/32234* (2013.01); *B01J 2219/32408* (2013.01)

(58) Field of Classification Search
CPC ...... B01D 46/0009; B01D 1/305; B01D 3/28; B01D 3/326; B01D 45/08; B01D 3/324; B01J 19/32; B01J 2219/32234; B01J 2219/32408
See application file for complete search history.

(56) References Cited

U.S. PATENT DOCUMENTS

| | | | | |
|---|---|---|---|---|
| 2,772,748 A | * | 12/1956 | Manning, Jr. ............ | B01D 3/22 95/216 |
| 2,926,754 A | * | 3/1960 | Ragatz ..................... | B01D 3/22 261/23.1 |
| 3,231,251 A | * | 1/1966 | Scheibel .................. | B01D 3/22 422/255 |
| 3,573,172 A | * | 3/1971 | Streuber .................. | B01D 3/20 261/114.5 |
| 4,051,206 A | * | 9/1977 | Bunas ...................... | B01D 3/22 261/109 |
| 4,275,021 A | * | 6/1981 | Kirkpatrick ............. | B01D 3/22 261/114.1 |
| 4,356,132 A | * | 10/1982 | Belyakov ................. | B01D 3/22 261/114.5 |

(Continued)

FOREIGN PATENT DOCUMENTS

| | | | | |
|---|---|---|---|---|
| CA | 2588694 A1 | * | 12/2006 | ............ B01D 3/008 |
| CN | 1154664 A | * | 7/1997 | ............... B01D 3/20 |

(Continued)

*Primary Examiner* — Stephen Hobson (57) ABSTRACT

A high capacity and high efficiency vapor-liquid contacting apparatus and process is useful in distillation columns and other vapor-liquid contacting processes. The apparatus is characterized by a half module comprising a downcomer against a shell of a vessel for transporting liquid to a subjacent stage which utilizes a demister to effect vapor-liquid separation at the downcomer outlet.

3 Claims, 5 Drawing Sheets

(56) References Cited

U.S. PATENT DOCUMENTS

| | | | | |
|---|---|---|---|---|
| 4,547,326 A * | 10/1985 | Weiler | B01D 3/20 | 261/114.1 |
| 4,750,975 A * | 6/1988 | Parker | B01D 3/20 | 203/1 |
| 5,244,604 A * | 9/1993 | Miller | B01D 3/20 | 261/114.1 |
| 5,387,377 A * | 2/1995 | Chuang | B01D 53/185 | 261/114.1 |
| 5,690,708 A * | 11/1997 | Danckaarts | B01D 3/20 | 261/114.1 |
| 5,837,105 A * | 11/1998 | Stober | B01D 1/30 | 203/99 |
| 5,885,488 A * | 3/1999 | Konijn | B01D 3/20 | 96/306 |
| 6,059,934 A * | 5/2000 | Stober | B01D 3/26 | 203/99 |
| 6,095,504 A * | 8/2000 | Heldwein | B01D 3/20 | 261/114.5 |
| 6,131,891 A * | 10/2000 | Resetarits | B01D 3/324 | 261/114.5 |
| 6,224,043 B1 * | 5/2001 | Fan | B01D 3/20 | 261/114.5 |
| 6,287,367 B1 * | 9/2001 | Buchanan | B01D 3/20 | 261/114.5 |
| 6,460,834 B2 * | 10/2002 | Konijn | B01D 3/20 | 261/114.5 |
| 6,682,633 B1 * | 1/2004 | Xu | B01D 3/16 | 203/99 |
| 6,739,585 B1 * | 5/2004 | Urbanski | B01D 3/008 | 261/114.5 |
| 6,824,750 B2 * | 11/2004 | Bravo | B01D 3/20 | 422/255 |
| 7,125,005 B2 * | 10/2006 | Colic | B01D 3/22 | 261/114.5 |
| 7,424,999 B2 * | 9/2008 | Xu | B01J 19/32 | 95/198 |
| 7,648,128 B2 * | 1/2010 | Lee | B01D 3/20 | 261/114.5 |
| 7,753,348 B2 * | 7/2010 | Lee | B01D 3/20 | 261/114.5 |
| 7,810,796 B2 * | 10/2010 | Xu | B01D 3/328 | 261/114.5 |
| 7,841,585 B2 * | 11/2010 | Konijn | B01D 3/20 | 55/452 |
| 7,909,966 B2 * | 3/2011 | Wu | B01D 3/324 | 261/114.5 |
| 7,981,201 B2 * | 7/2011 | Xu | B01D 3/324 | 261/114.5 |
| 8,020,838 B2 * | 9/2011 | Heldwein | B01D 3/324 | 261/114.5 |
| 8,052,126 B2 * | 11/2011 | Xu | B01D 3/008 | 261/114.5 |
| 8,083,901 B2 * | 12/2011 | Sharma | B01D 3/205 | 203/40 |
| 8,246,016 B2 * | 8/2012 | Xu | B01D 3/20 | 261/114.5 |
| 8,608,833 B2 * | 12/2013 | Xu | B01D 53/185 | 261/114.5 |
| 8,833,742 B2 * | 9/2014 | Xu | B01D 3/24 | 261/114.5 |
| 9,295,926 B2 * | 3/2016 | Nieuwoudt | B01D 3/326 | |
| 9,700,831 B2 * | 7/2017 | Matten | B01D 53/18 | |
| 10,413,841 B2 * | 9/2019 | Hammon | C07C 51/44 | |
| 2001/0015136 A1 * | 8/2001 | Letzel | B01D 3/20 | 96/356 |
| 2004/0099970 A1 * | 5/2004 | Zich | B01D 3/12 | 261/114.5 |
| 2004/0107682 A1 * | 6/2004 | Letzel | B01D 53/18 | 55/444 |
| 2004/0207103 A1 * | 10/2004 | Colic | B01D 3/22 | 261/114.5 |
| 2005/0236724 A1 * | 10/2005 | Buchanan | B01D 45/08 | 261/114.1 |
| 2006/0273616 A1 * | 12/2006 | Xu | B01D 3/20 | 296/107.01 |
| 2007/0040289 A1 * | 2/2007 | Pilling | B01D 3/22 | 261/114.5 |
| 2007/0137482 A1 * | 6/2007 | Xu | B01D 3/324 | 95/198 |
| 2009/0200689 A1 * | 8/2009 | Nelson | B01D 3/008 | 261/112.1 |
| 2010/0011724 A1 * | 1/2010 | Xu | B01D 45/08 | 55/459.1 |
| 2010/0162890 A1 * | 7/2010 | Xu | B01D 3/324 | 55/320 |
| 2010/0162891 A1 * | 7/2010 | Xu | B01D 3/008 | 261/114.1 |
| 2010/0163397 A1 * | 7/2010 | Xu | B01D 3/008 | 202/162 |
| 2010/0242730 A1 * | 9/2010 | Heldwein | B01D 3/20 | 261/114.5 |
| 2010/0244290 A1 * | 9/2010 | Xu | B01D 3/008 | 261/114.1 |
| 2011/0303089 A1 * | 12/2011 | Xu | B01D 3/008 | 95/213 |
| 2012/0024977 A1 * | 2/2012 | Buttridge | B01D 3/20 | 261/114.5 |
| 2013/0062792 A1 * | 3/2013 | Xu | B01D 3/28 | 261/114.1 |
| 2013/0328222 A1 * | 12/2013 | Franz | B01D 53/185 | 261/74 |
| 2015/0001038 A1 * | 1/2015 | Katyal | B01D 3/42 | 261/36.1 |
| 2015/0352464 A1 * | 12/2015 | Glüer | B01D 3/10 | 261/109 |
| 2016/0151722 A1 * | 6/2016 | Wehrli | B01F 23/2321 | 261/114.5 |
| 2018/0299194 A1 * | 10/2018 | Baxter | B01D 5/003 | |
| 2019/0009186 A1 * | 1/2019 | Corson | B01D 3/205 | |
| 2019/0299119 A1 * | 10/2019 | Xu | B01J 19/32 | |
| 2019/0299120 A1 * | 10/2019 | Xu | B01D 3/26 | |
| 2019/0299138 A1 * | 10/2019 | Xu | B01J 19/32 | |
| 2023/0105091 A1 * | 4/2023 | Bhargava | B01D 3/328 | 202/158 |

FOREIGN PATENT DOCUMENTS

| | | | | |
|---|---|---|---|---|
| CN | 104039410 A * | 9/2014 | | B01D 3/20 |
| CN | 104784968 B * | 6/2016 | | |
| DE | 102010026523 A1 * | 1/2012 | | B01D 3/225 |
| EP | 1588750 A1 * | 10/2005 | | B01D 3/20 |
| FR | 2933310 A1 * | 1/2010 | | B01D 3/008 |
| JP | 5248289 B2 * | 7/2013 | | |
| WO | WO-9926718 A1 * | 6/1999 | | B01D 3/20 |
| WO | WO-0160481 A2 * | 8/2001 | | B01D 3/20 |
| WO | WO-0234350 A1 * | 5/2002 | | B01D 3/20 |
| WO | WO-02074404 A1 * | 9/2002 | | B01D 45/08 |
| WO | WO-2004092108 A1 * | 10/2004 | | C07C 51/44 |
| WO | WO-2007081622 A2 * | 7/2007 | | B01D 1/305 |
| WO | WO-2023016873 A1 * | 2/2023 | | B01D 1/221 |

* cited by examiner

VAPOR-LIQUID CONTACTING APPARATUS AND PROCESS WITH DOWNCOMER AT SHELL

RELATED APPLICATIONS

This application is a Divisional of U.S. patent application Ser. No. 15/940,895 filed on Mar. 29, 2018, the entirety of which is incorporated herein by reference.

FIELD

The field is vapor-liquid contacting for mass and/or heat transfer. The field specifically relates to a process and apparatus providing a high capacity fractionation useful in fractional distillation columns to separate volatile chemicals such as hydrocarbons.

BACKGROUND

Vapor-liquid contacting devices, such as fractionation trays and packings, are employed to perform an almost endless variety of separations in the petroleum and petrochemical industries. Fractionation trays are used, for example, in the separation of many different hydrocarbons such as paraffins, aromatics and olefins. Trays are used to separate specific compounds such as different alcohols, ethers, alkylaromatics, monomers, solvents, inorganic compounds, atmospheric gases, etc. and in the separation of broad boiling mixtures such as petroleum derived fractions including crude oil, naphtha, and LPG. Vapor-liquid contacting trays are also used to perform gas processing, purification, and absorption. A wide variety of trays and other contacting devices having differing advantages and disadvantages has been developed.

Fractionation trays and packings are the predominant form of conventional fractional distillation apparatus. They are widely used in the chemical, petrochemical and petroleum refining industries to promote vapor-liquid contacting performed in fractionation columns. The normal configuration of a fractionation column includes about 10 to 250 individual trays. Often the structure of each tray in the column is similar, but it is also known that the structures may alternate on vertically adjacent trays. Trays are mounted horizontally, typically at uniform vertical distances referred to as the tray spacing of the column. This distance may vary within different sections of the column. The trays are often supported by a ring welded to the inner surface of the column.

During the fractional distillation process using conventional trays, vapor generated at a lower location in the column rises through liquid spread over the decking area of the tray. The passage of the vapor through the liquid generates a layer of bubbles referred to as froth. The high surface area of the froth helps to quickly establish a compositional equilibrium between the vapor and liquid phases on the tray. The froth is then allowed to separate into vapor and liquid. During mass transfer, the vapor loses less volatile material to the liquid and thus becomes slightly more volatile as it passes upward through each tray. Simultaneously the concentration of less volatile compounds in the liquid increases as the liquid moves downward from tray to tray. The liquid separates from the froth and travels downward to the next lower tray. This continuous froth formation and vapor-liquid separation is performed on each tray. Vapor-liquid contactors therefore perform the two functions of contacting the rising vapor with liquid and then allowing the two phases to separate and flow in different directions. When the steps are performed a suitable number of times on different trays, the process leads to separation of chemical compounds based upon their relative volatility.

Many different types of vapor-liquid contacting devices including packing and trays have been developed as a result of the desire to improve equipment having this utility in the petroleum refining, chemical, and petrochemical industries. Different apparatuses tend to have different advantages. For instance, multiple downcomer trays have high vapor and liquid capacities and the ability to function effectively over a significant range of operating rates. Structured packing tends to have a low pressure drop making it useful in low pressure or vacuum operations. Two very important characteristics of vapor-liquid contacting equipment in which improvement is always sought are capacity and efficiency.

Fractional distillation has traditionally been conducted in cross flow or counter current contacting devices having an overall downward liquid flow and an upward vapor flow. At some point in the apparatus the vapor and liquid phases are brought into contact to allow the vapor and liquid phases to exchange components and approach equilibrium with each other. The vapor and liquid are then separated, moved in the appropriate direction and contacted again with another quantity of the appropriate fluid. In many vapor-liquid contacting devices, vapor and liquid may be contacted in a cross flow arrangement at each stage. An alternative apparatus differs from traditional multi-stage contacting systems in that while the overall flow in the apparatus continues to be counter-current, each stage of actual contacting between the liquid and vapor phases is performed in a co-current mass transfer zone. A co-current contacting device can also achieve high mass transfer efficiency through the co-current contacting of fine liquid droplets with vapor. A co-current vapor-liquid contacting apparatus may have contacting channels that discharge vapor and liquid into separation chambers in a module. Vapor flows upward from the separation chambers to the contacting channel of the next higher module and liquid flows down through a liquid distributor to the next lower contacting channel.

SUMMARY

A high capacity and high efficiency vapor-liquid contacting apparatus and process is useful in distillation columns and other vapor-liquid contacting processes. The apparatus is characterized by a half module comprising a downcomer against a shell of a vessel for transporting and distributing liquid to a subjacent stage. The downcomer is equipped with a demister at its outlet for vapor-liquid separation

DETAILED DESCRIPTION

Figure 1:
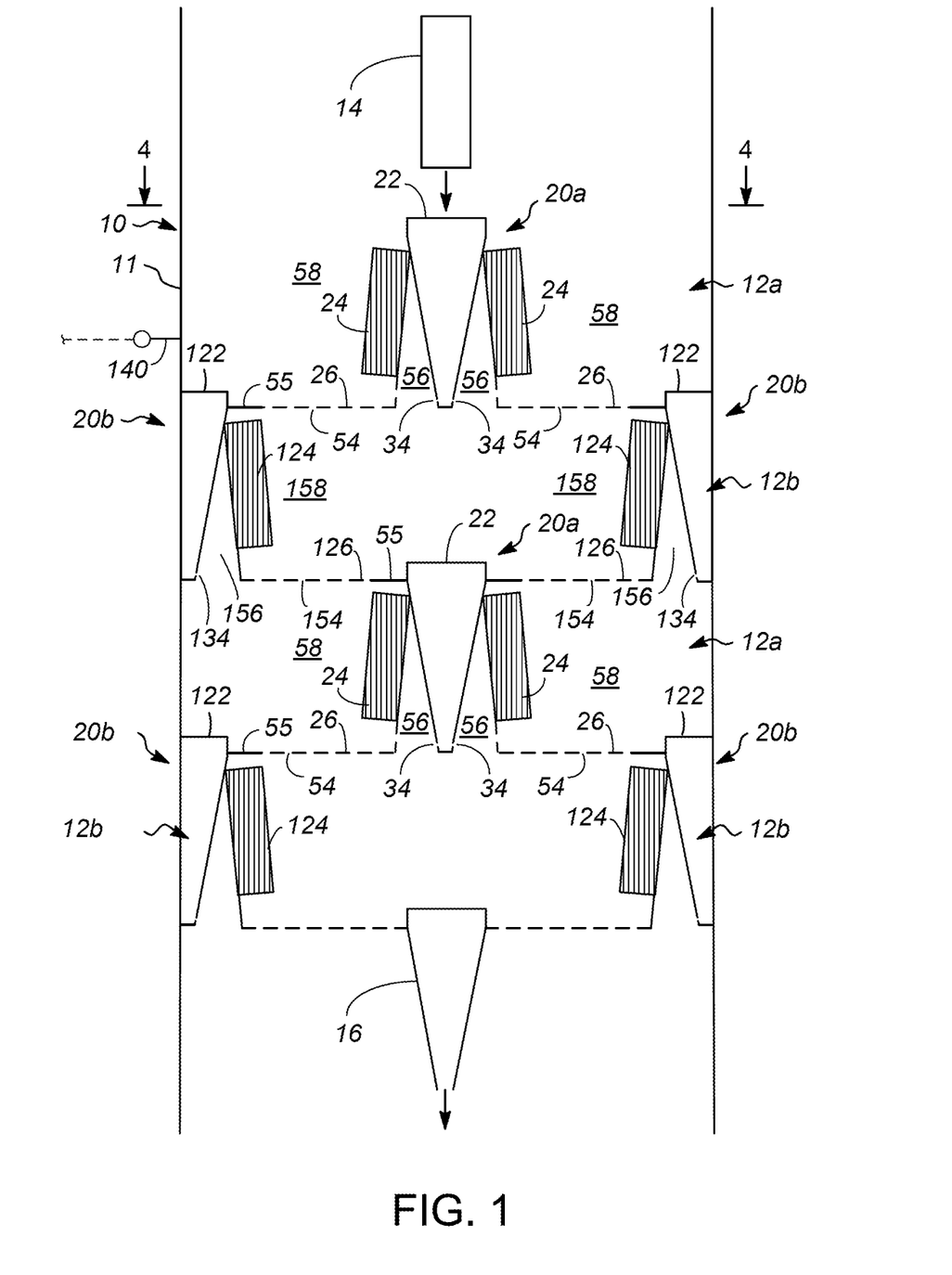
FIG. 1 is a cross-sectional schematic of a vapor-liquid contacting column employing contacting modules of the present invention.

Referring to FIG. 1, there is shown an embodiment of a vapor-liquid contacting apparatus within a vessel 10. The vessel 10 may be for example a distillation column, absorber, direct contact heat exchanger, separator or other vessel used to conduct vapor-liquid contacting. The vessel 10 contains at least one section of contacting stages 12 and optional collector/distributors above and below the section. An upper portion of the section may contain a top collector/distributor 14 and a lower portion of the section may contain a bottom collector/distributor 16. For simplicity, only four contacting stages 12a, 12b are shown. As is well known in the art, a distillation column may contain several sections. Each section may contain numerous contacting stages, and there may be a plurality of fluid feeds and/or withdraws between and/or within sections. Also, different contacting devices may be mixed in the same and/or different sections of the same column. Devices such as chimney trays and liquid distributors may be used in the space between sections for the feeds, withdrawals, and fluid collection and redistribution. The vessel 10 includes an outer shell 11 that is typically in the form of a cylinder, or, alternatively, any other shape.

FIG. 1 illustrates an embodiment with contacting modules 20 incorporated into a multi-pass tray with the contacting modules in parallel but spaced horizontally between stages. FIG. 1 illustrates a two-pass tray specifically, but more or less passes per tray are contemplated. A plurality of stages 12 comprise full contacting stage 12a including at least one full module 20a and a transition stage 12b comprising two one-half modules 20b horizontally offset from modules 20a on the preceding superior stage 12a. "Offset" means that modules in adjacent stages 12a, 12b are vertically unaligned with each other, further meaning that modules in adjacent stages do not occupy the same horizontal position even though they are preferably parallel with each other. Modules 20a, 20b of every other contacting stage 12a, 12b may be vertically aligned. In the full stage 12a with a full contacting module 20a, a receiving deck 26 is inferior to the contacting module 20a and a half liquid distributor comprising a downcomer 122 of a half module 20b is inferior to the receiving deck 26.

Contacting modules 20 can be incorporated into single-pass, multiple-pass, or other stage 12 adjacent to existing downcomers. For example, a single-pass stage with one downcomer adjacent to shell 11 will have one one-half module on one side of the stage adjacent to shell 11 and the modules on vertically spaced adjacent stage on an opposite side of the stage adjacent to the shell 11. For four-pass stages, there will be two full modules 12a on one stage located offset from center of the stage and one full module 12a at the center and two one-half modules 20b on two sides adjacent to shell 11 on the vertically spaced adjacent stage. Again, the modules on the vertically spaced adjacent stages are horizontally offset from each other.

Figure 2:
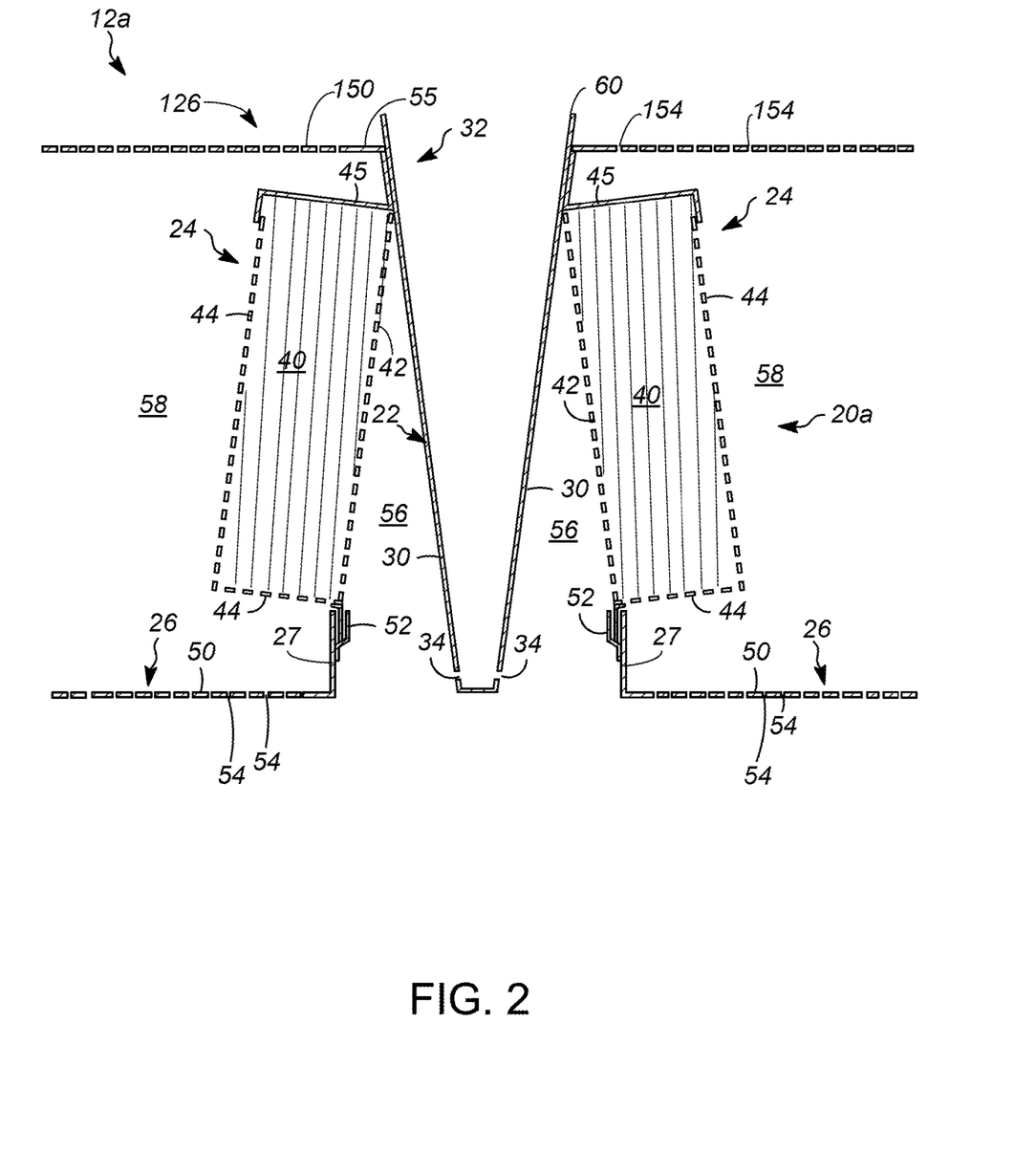
FIG. 2 is a cross-sectional schematic of a full module of FIG. 1.

As shown in FIG. 2, each full contacting module 20a includes a liquid distributor 22 located adjacent a demister 24 and preferably between a pair of demisters 24. A co-current fluid contacting volume 56 is provided between each liquid distributor 22 and an adjacent demister 24. In addition to the full contacting module 20a, each full contacting stage 12a also includes a receiving decks 26 below a demister 24. The receiving deck 26 has a base 50 that includes perforations 54 to allow vapor to rise therethrough and contact liquid on the deck 26.

Figure 4:
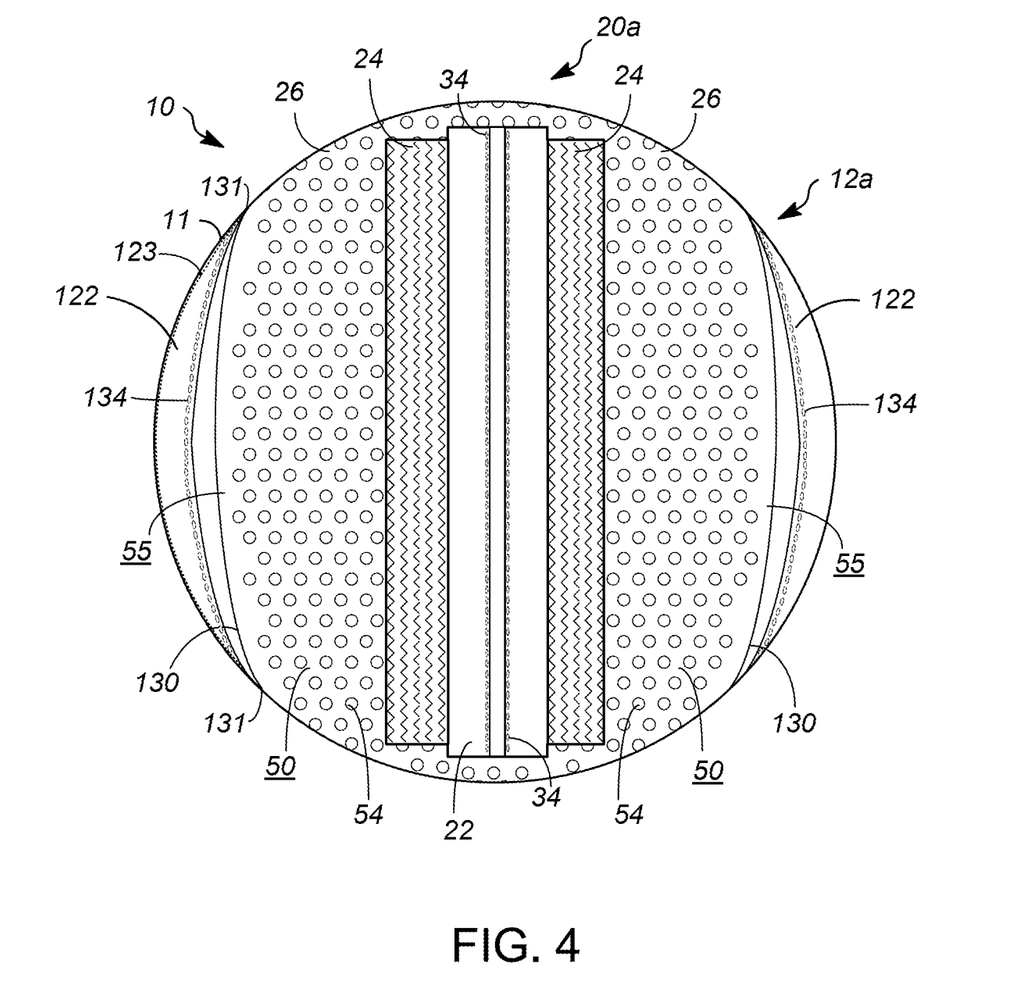
FIG. 4 is a top plan view of a full stage of the column of FIG. 1.

FIG. 4 is a sectional view taken at segment 4-4 of FIG. 1 showing the full contacting stage 12a. The downcomers 122 adjacent to shell 11 of the vessel 10 can have a curved downcomer inner wall 130 at an inward edge that is contoured to the shell 11 of the vessel 10 to increase the length of the half modules. The downcomer 122 is adjacent to the shell 11 of the vessel 10. The downcomer 122 may share a wall with the shell 11, such that edges 131 of a downcomer inner wall 130 contact the shell. By "adjacent" is meant that the downcomer shares a wall with the shell 11 or an optional outer wall 123 of the downcomer, the wall closest to the shell, if there is one, is no more than 6 inches (15 cm) and preferably no more than 2 inches (5 cm) from the shell 11 of the vessel 10. An optional outer wall 123 adjacent to the shell 11 is depicted in FIG. 4 in phantom. If the downcomer has an outer wall 123 that is separate from the shell 11, the outer wall may be adjacent to the shell.

Figure 5A:
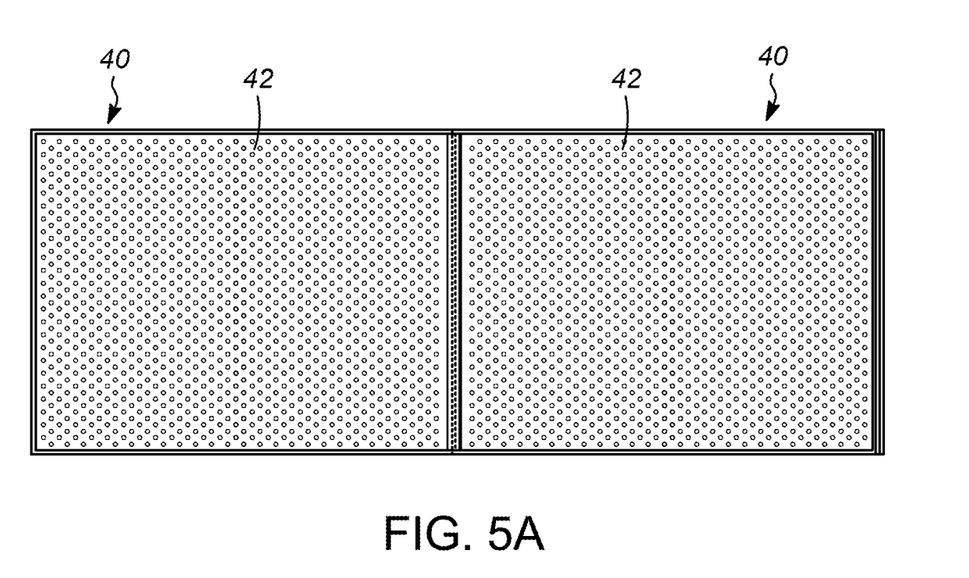
FIGS. 5A and 5B are elevational and sectional views of the demisters of FIG. 1, respectively.
Figure 5B:
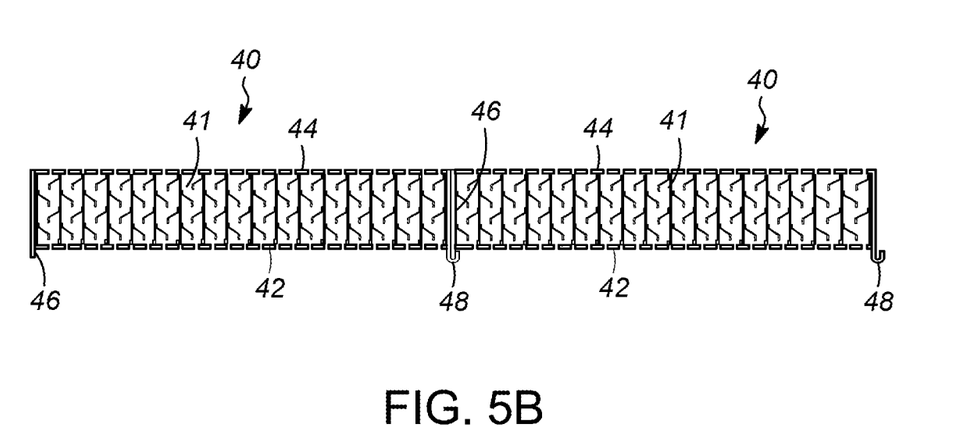

Demisters units shown in FIGS. 5A, 5B may be used to accommodate the curved downcomer 122. At contacting stage 12a, the receiving decks 26 are substantially parallel and are spaced apart across the cross sectional area of the vessel 10. Bases 50 of the receiving decks 26 are equipped with perforations 54 such as sieve holes, valves or bubble caps to allow vapor to bubble up through the liquid on the deck. The liquid distributor 22 is equipped with a plurality of outlets 34 and is located between a pair of adjacent receiving decks 26. A pair of demisters 24 flank the liquid distributor 22. A half liquid distributor comprising a downcomer 122 is located adjacent and inferior to or downstream of the receiving deck 26. Optional calm areas 55 in the receiving decks 26 immediately adjacent the liquid distributors 22 and the downcomers 122 may be imperforate to minimize vapor entrainment into the liquid distributors and downcomers.

Turning to FIG. 2, the liquid distributor 22 of the present embodiment has an inlet 32 in an upper portion and a plurality of outlets 34 in a lower portion. Two sloped liquid distributor walls 30 taper the liquid distributor 22 inwardly in a downward direction. The bottom of the substantially V-shaped liquid distributor may be pointed or curved or may be flat as shown in FIG. 2. Alternative embodiments having liquid distributors of various different shapes, such as stepped or sloped and stepped, may be envisioned.

The liquid distributor outlets 34 are formed by a plurality of slots or other types of perforations arranged in one or more rows proximate to the bottom of the liquid distributor 22. The liquid distributor outlets 34 may also be formed by punching the distributor wall 30 without removing the punched material to form directional slots or louvers for directing outlet liquid upward into the contacting volume to minimize liquid weeping to the inferior stage without passing through the contact volume 56 and demister 40. The outlets 34 may be located in the walls 30 and/or the bottom of the liquid distributor 22. In operation, a liquid level in the liquid distributor 22 provides a seal to prevent the ascending vapor from entering the liquid distributor through the outlets 34. The perforations 34 are preferably distributed along the length of the liquid distributor 22.

Figure 3:
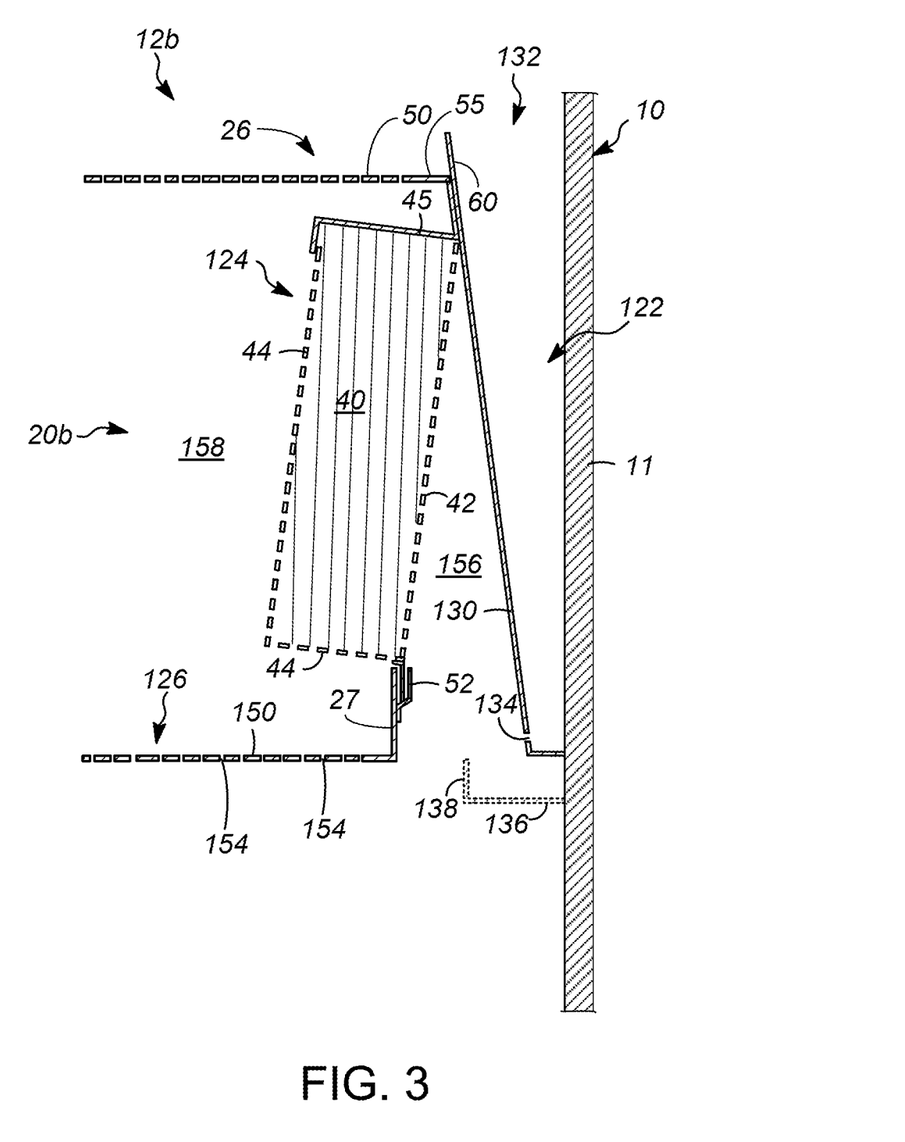
FIG. 3 is a cross-sectional schematic of a half module of FIG. 1.

Turning to FIG. 3, the half-module 20b provides a downcomer 122 that is inferior to the receiving deck 26 of the superior full stage 12a. Each half module 20b includes a downcomer 122 located adjacent a transport demister 124. A co-current transition contacting volume 156 is provided between each downcomer 122 and an adjacent transport demister 124. The downcomer 122 is between the shell 11 and the transport demister 124. The downcomer 122 transports liquid from a superior full stage 12a to an inferior transition contacting stage 12b. The contacting stage 12b also includes a transport deck 126 below the adjacent demister 124. The transport deck 126 has a base 150 that includes perforations 154 to allow vapor to rise therethrough and cross-contact liquid on the transport deck 126.

The downcomer 122 has an inlet 132 in an upper portion and a plurality of outlets 134 in a lower portion. A sloped inner downcomer wall 130 tapers the downcomer 122 outwardly in a downward direction. The bottom of the downcomer 122 may be pointed or curved or may be flat as shown in FIG. 3.

The liquid outlets 134 are formed by a plurality of slots or other types of perforations arranged in one or more rows proximate to the bottom of the downcomer 122. The liquid outlets 134 may also be formed by punching the distributor wall 130 without removing the punched material to form directional slots or louvers for directing outlet liquid upward into the contacting volume 156 to minimizing liquid weeping to the inferior tray without passing through the contacting volume 156 and demister 40. The outlets 134 may be located in the wall 130 and/or the bottom of the downcomer 122. In operation, a liquid level in the downcomer 122 provides a seal to prevent the ascending vapor from entering the downcomer through the outlets 134. The perforations 134 are preferably distributed along the length of the downcomer 122.

An optional inlet plate 136 depicted in phantom in FIG. 3 may be located vertically adjacent the downcomer 122 to mitigate bypassing. An optional lip 138, also in phantom, on each inlet plate 136 impedes downward liquid flow from the downcomer 122 and directs liquid upwardly toward the demister 124 entraining the liquid in rising vapor from an inferior stage. Such optional plates are also contemplated below inlets for the full contacting module 20a.

The demister 24, 124 may be assembled from a plurality of demister units 40 shown in FIGS. 5A and 5B. FIG. 5A illustrates the perforated surface 42 of the demister unit 40. The demister units 40 may further include a male end plate 46 and a female end plate 48, each of which cooperates with complimentary end plate of an adjacent demister unit 40 to form a seal that substantially prevents fluid leakage through the junction. Such male and female end plates represent one type of interlocking mechanism that may be used to construct a demister 24, 124 from modular demister units 40. Any known interlocking mechanism may be used. In other embodiments the modular units 40 may be fastened together by other known means such as using bolts, clips, pins, clamps, bands, or welding, or gluing. Mechanisms such as a male and female tab and slot combination can provide advantages for quick assembly and disassembly. The modular configuration of the demister 24, 124 allows a fabricator to produce demister units in one or a small number of standard sizes to be assembled into demisters 24, 124 of varying length. Some custom-sized demister units 40 may be required for a particularly short demister 24, 124 or to match the length of a liquid distributor 22, or downcomer 122 depending on the dimensions of the apparatus and the variety of standard size demister units 40 available. The modular design has the further advantage of easing the assembly of the contacting module 20 since the demister units 40 are lighter than a demister row formed of a single unit. However, in other embodiments a single demister unit 40 defines a complete demister 24, 124.

The demister units 40 comprise a vapor-liquid separation structure 41. Various designs are used to de-entrain liquid droplets from a vapor stream. One example is mist eliminators, such as a vane type demister which have various channels and louvers such that the fluid stream passing through the demister must undergo several changes in direction which cause the entrained liquid droplets to impact portions of the separation structure 41 and flow downward to the bottom of the demister. Another example of known vapor-liquid separation devices are mesh pads or woven threads. Combinations of these mist eliminator technologies can also be used. Examples of suitable demister units 40 are provided in U.S. Pat. No. 7,424,999.

As shown in FIG. 2 and FIG. 3, various optional elements may cooperate with and/or be incorporated into the demister to further improve the performance and/or structural integrity of the apparatus. For example, a perforated inlet plate 42 as an inlet surface, a perforated outlet plate 44 as an outlet surface, and an imperforate top plate 45 are shown. Perforated plates are one type of flow manipulator that may cooperate with the demister. Other non-limiting examples of flow manipulators include expanded metal, porous solids, mesh pads, screens, grids, mesh, profile wire screens, and honeycombs. It has been found that the fractional open area of the flow manipulators affect both separation efficiency and pressure drop of the demister. The fractional open area of the flow manipulators may vary on different sides and on the same side of the demister to optimize the separation efficiency and pressure drop of the demister. Various types of flow manipulators may be used in a single demister. In other embodiments, flow manipulators are not used on some or any of the inlet and outlet surfaces of the demister.

The perforated inlet plate 42 is proximate the liquid distributor 22 and downcomer 122. The perforated outlet plate 44 extends the majority of the demister side opposite to the perforated inlet plate 42 and along the bottom of the demister unit 40. The imperforate top plate prevents liquid from leaving the demister unit 40 directly from the top of the unit and increases the vapor-liquid separation efficiency. The imperforate top plate 45 has bent strips on both sides, one following liquid distributor wall 30 and the downcomer wall 130 for attaching with the wall and the other following the perforated outlet plate 44 of the demister 40 for connecting with the perforated outlet plate 44. It has been found that the imperforate strip extending down a distance from the top of the perforated outlet plate 44 also improves vapor-liquid separation efficiency. In one embodiment, the strip extends to cover about 10% of the height of the demister outlet. In another embodiment the strip extends to about 30% of the height of the demister outlet. In a further embodiment the strip extends to about 50% of the height of the demister outlet.

Each of the receiving decks 26 and transport decks 126 includes vertically extending lips 27 under demister 40. The lips 27 may be formed integrally with the base 50 or 150 or separately by a structure for supporting the demister 40 and decks 26 or transport decks 126. The support rails 52 engage the base of the demister units 40 in a particular demister 24. A support flange attached to the bottom of each demister unit 40 is inserted into the support rail 52, and the top of the demister is fastened to the liquid distributor wall 30 or downcomer wall 130, proximate to the liquid distributor inlet 32 or downcomer inlet 132. The support rails 52 provide structural support for the demister units 40 even before the demister units 40 have been fastened to the liquid distributor 22 or downcomer 122. In this embodiment, each full contacting module 20a has two demister rows 24, one on each side of the liquid distributor 22, while the half modules 20b that are proximate to the vessel shell 11 have one demister row 124 on an inside of the downcomer 122.

In another embodiment, a weir 60 at the liquid distributor 22 and the downcomer 122 extending above the base 50 of the perforated receiving deck 26 and the base 150 of the transport deck 126 holds a desired liquid level on the deck. The receiving decks 26 and transport decks 126 equipped with the weir 60 increase liquid holdup on decks and improve vapor-liquid contact and increase mass transfer efficiency.

As shown in full contacting module 20a in FIG. 2, the volume between the inlet surface 42 of a demister 24 and the adjacent wall 30 of the liquid distributor 22 provides a fluid contacting volume 56. As shown in a half contacting module 20b in FIG. 3, the volume between the inlet surface 42 of a demister 124 and the adjacent wall 130 of the downcomer 122 forms a transition contacting volume 156. The fluid contacting continues in the demisters units before vapor and liquid are separated. The perforated plate 42 or other flow manipulator at the demister inlet improves fluid flow distribution to the demister and improves vapor-liquid separation. The inlet flow manipulator may also improve fluid contacting and mass transfer. In the full contacting module 20a in FIG. 2, the volume above the receiving deck 26 and outward of the outlet surface 44 of the adjacent demister 24 defines an outward fluid transfer volume 58. In the half contacting module 20b in FIG. 3, the volume above the transport deck 126 and inward of the outlet surface 44 of the adjacent demister 124 defines an inward fluid transfer volume 158. The demister 24, 124 may be oriented at an angle from vertical as illustrated in FIG. 2 and FIG. 3 to provide a contacting volume 56, 156, which, in the present embodiment, has a decreasing volume from bottom to top to match with the decreased fluid flow and a fluid transfer volume 58, 158, which, in the present embodiment, has an increasing volume from bottom to top to match with the increasing vapor flow. Due to perforations in the receiving decks 26 and the transport decks 126, vapor-liquid cross-contacting occurs in the fluid transfer volume 58, 158.

The liquid distributors 22, the downcomers 122 and the receiving decks 26, transport decks 126 may be supported by support rings and supporting bars, not shown, which are affixed to the inner surface of the column shell 11 such as by welding or other conventional means. Additional beams may be required for supporting the decks 26, 126 and demisters 24, 124. The liquid distributors 22, the downcomers 122, the receiving decks 26 and the transport decks 126 may be bolted, clamped, or otherwise secured to the support ring or bars so that the liquid distributors 22, the downcomers 122, the receiving decks 26 and the transport decks 126 are kept in position during operation. In a particular embodiment, the end of the liquid distributor 22 includes an end seal welded to the end of the liquid distributor 22 to thereby seal the end of the liquid distributor 22. Further, strengthening features such as ribs, braces, increased material thickness, and additional supports may be used with the liquid distributors 22, the downcomers 122, the receiving decks 26 and the transport decks 126. The ends of the liquid distributors 22 may be configured in a variety of ways to follow the contour of the vessel shell.

Referring to FIG. 1, the fluid flow of a contacting module 20a of a full contacting stage 12a is described hereinafter. The liquid from a superior deck 126 or a distributor flows into the liquid distributor 22. The liquid exits the liquid distributor 22 through liquid distributor outlets 34 and enters the fluid contacting volume 56. Referring also to FIG. 2 in addition to FIG. 1, the upward vapor velocity at the inlet of the fluid contacting volume 56 is so high that the liquid entering the contacting volume 56 is entrained upwardly by the vapor. The entrained liquid is carried upward by the vapor into the inlet surfaces 42 of the demister 24. The vapor and liquid are separated by the separating structures 41, shown in FIG. 5B, within the demister units 40 and the vapor exits the demister units 40 through the outlet surface 44 into the outer fluid transfer volume 58.

The vapor out of the demister 24 mixes with the vapor in the transfer volume 58 and then continues upward to a contacting volume 156 in a half contacting module 20b or through perforations 154 in the transport decks 126 of a superior transition stage 12b. The liquid exits the demister 24 through the bottom portion of the outlet surface 44 and flows onto the receiving deck 26. The receiving deck 26 directs the liquid into the downcomer 122 of a transition stage 12b. Moreover, liquid on the receiving decks 26 is also cross-contacted with vapor ascending through perforations 54 in the receiving decks.

Referring also to FIG. 3 in addition to FIG. 1, the fluid flow through a half contacting module 20b of a transition stage 12b is now described hereinafter. The liquid from a superior full stage 12a or distributor is directed into the downcomer 122. Liquid descending in the downcomer 122 contacts an inner surface of the shell 11 of the vessel 10 or an optional outer wall 123 of the downcomer adjacent to the shell. The liquid exits the downcomer 122 through outlets 134 and enters the transition contacting volume 156. The upward vapor velocity is high in the transition contacting volume 156 and the liquid entering the transition contacting volume 156 is entrained by the vapor. The entrained liquid is carried upwardly by the vapor into the inlet surfaces 42 of the demisters 124. The vapor and liquid are separated by the separating structures 41, shown in FIG. 5B, within the demister units 40 and the vapor exits the demister units 40 through the outlet surfaces 44 into the inner fluid transfer volume 158.

The vapor out of the demister 124 mixes with the vapor in the transfer volume 158 and then continues upwardly to a fluid contacting volume 56 or through perforations 54 in the receiving decks 26 of a full contacting stage 12a. The liquid exits the demister units 40 through the bottom portion of the outlet surface 44 and flows onto the transport deck 126. The transport deck 126 directs the liquid into an inferior liquid distributor 22 of an inferior full contacting stage 12a. Moreover, liquid on the transport decks 126 is also cross-contacted with vapor ascending through perforations 154 in the transport deck.

The opening at the inlet of the contact volume 56, 156 is sized such that at least 95%, or more preferably, at least 99% of the liquid exiting outlets 34, 134 of liquid distributor 22, downcomer 122 is entrained upwardly by vapor. Use of louvers or slots at outlets 34, 134 for directing liquid up into the contacting volume reduces tendency of liquid falling to the inferior stage without passing through the contacting volume and the demister.

The ends of the contacting module 20a, 20b that is, the terminal portions of the module 20a, 20b which face the inner surface of the shell 11 of the enclosing vessel 10, may be sealed to prevent unintended vapor or liquid bypassing of the contacting apparatus. In this embodiment, the ends of the module 20a, 20b are tapered or curved to conform to the curvature of the enclosing structure. Alternately, the ends of the modules 20a, 20b are flat and a horizontal imperforate extension plate spans the gap from the module 20a, 20b to the enclosing vessel wall.

Operating conditions for a fractionation column are confined by the physical properties of the compounds being separated in the column. Operating temperature and pressure of a column may be varied within these confines to minimize the operating cost of the column and accommodate other commercial objectives. The operating temperature may range from very low temperatures used in cryogenic separations to temperatures which challenge the thermal stability of the compounds. Conditions suitable for the subject process therefore include a temperature in the broad range of from about −50° C. to about 400° C. The column is operated at a pressure sufficient to maintain at least a portion of the feed compounds present as a liquid.

The perforations 54, 154 in the bases 50, 150 of the receiving decks 26 and transport decks 126 promote cross-flow vapor liquid contacting which enables the spacing between modules 20*a*, 20*b* while still effecting vapor-liquid contacting. Consequently, fewer modules 20*b* may be installed on a contacting stage 12*a*, 12*b* resulting in substantial cost savings. With the reduced number of modules 20*a*, 20*b* and the additional vapor-liquid contacting on receiving decks 26 and transport decks 126, the mass transfer efficiency of each stage is increased.

By incorporating modules 20*a* and 20*b* into single- or multiple-pass trays, the capacity and efficiency of the trays can be increased. By arranging modules 20*a* and 20*b* at the inlet of liquid to each of the stages followed by the perforated decks for vapor and liquid cross-flow and contacting, the liquid hold-up and vapor-liquid contacting through the perforated decks and the pressure drop through each of the stages can be maintained close to existing multiple-pass trays, which is especially beneficial for revamp of existing columns containing multiple-pass trays.

Any of the above lines, conduits, units, devices, vessels, surrounding environments, zones or similar equipment collectively understood as process equipment may be equipped with one or more monitoring components including sensors, measurement devices, data capture devices or data transmission devices. A sensor 140 which communicates with the vessel 10 is shown in FIG. 1. The sensor 140 senses a parameter such as a condition in the vessel 10 and transmits data such as a signal to a receiver (not shown). Signals, process or status measurements, and data from monitoring components may be used to monitor conditions in, around, and on the process equipment. Signals, measurements, and/or data generated or recorded by monitoring components may be collected, processed, and/or transmitted to the receiver through one or more networks or connections that may be private or public, general or specific, direct or indirect, wired or wireless, encrypted or not encrypted, and/or combination(s) thereof; the specification is not intended to be limiting in this respect.

Signals, measurements, and/or data generated or recorded by monitoring components may be transmitted to a receiver that may comprise one or more computing devices or systems. Computing devices or systems may include at least one processor and memory storing computer-executable instructions including readable instructions that, when executed by the at least one processor, cause the one or more computing devices to perform a process that may include one or more steps. For example, the one or more computing devices may be configured to receive, from one or more monitoring component, data related to at least one piece of process equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

Specific Embodiments

While the following is described in conjunction with specific embodiments, it will be understood that this description is intended to illustrate and not limit the scope of the preceding description and the appended claims.

A first embodiment of the invention is an apparatus for performing vapor-liquid contacting, comprising a vessel comprising a shell; a first contact module comprising a downcomer, the downcomer is adjacent to a shell of the vessel and comprises an outlet proximate to a contacting volume; and a demister having an inlet surface proximate to the contacting volume. An embodiment of the invention is one, any or all of prior embodiments in this paragraph up through the first embodiment in this paragraph further comprising a transport deck inferior to an outlet of the demister. An embodiment of the invention is one, any or all of prior embodiments in this paragraph up through the first embodiment in this paragraph wherein the downcomer shares a wall with the shell. An embodiment of the invention is one, any or all of prior embodiments in this paragraph up through the first embodiment in this paragraph wherein a wall of the downcomer has an edge that is in contact with the shell. An embodiment of the invention is one, any or all of prior embodiments in this paragraph up through the first embodiment in this paragraph wherein the wall is curved. An embodiment of the invention is one, any or all of prior embodiments in this paragraph up through the first embodiment in this paragraph wherein the wall is sloped. An embodiment of the invention is one, any or all of prior embodiments in this paragraph up through the first embodiment in this paragraph wherein the deck is perforated. An embodiment of the invention is one, any or all of prior embodiments in this paragraph up through the first embodiment in this paragraph wherein the downcomer is between the shell and the demister. An embodiment of the invention is one, any or all of prior embodiments in this paragraph up through the first embodiment in this paragraph wherein the downcomer is inferior to a receiving deck. An embodiment of the invention is one, any or all of prior embodiments in this paragraph up through the first embodiment in this paragraph wherein the receiving deck is perforated. An embodiment of the invention is one, any or all of prior embodiments in this paragraph up through the first embodiment in this paragraph wherein the receiving deck is imperforate adjacent the downcomer. An embodiment of the invention is one, any or all of prior embodiments in this paragraph up through the first embodiment in this paragraph further comprising a weir adjacent to the downcomer extending above a base of the receiving deck for holding up liquid on the receiving deck. An embodiment of the invention is one, any or all of prior embodiments in this paragraph up through the first embodiment in this paragraph further comprising a full contact module inferior to the transport deck, the contact module comprising a liquid distributor between two demisters. An embodiment of the invention is one, any or all of prior embodiments in this paragraph up through the first embodiment in this paragraph wherein the first contact module and the full contact module are offset from each other. An embodiment of the invention is one, any or all of prior embodiments in this paragraph up through the first embodiment in this paragraph further comprising at least one of a processor; a memory storing computer-executable instructions; a sensor positioned at a location to sense at least one parameter; and a receiver configured to receive data from the sensor.

A second embodiment of the invention is an apparatus for performing vapor-liquid contacting, comprising a plurality of stages, each stage having a contact module and a deck; a first contact module comprising a downcomer with edges in contact with a shell of the vessel and an outlet proximate to a contacting volume and a demister having an inlet surface proximate to the contacting volume and an outlet surface superior to a transport deck.

A third embodiment of the invention is a process for vapor-liquid contacting, comprising the steps of directing liquid through an inlet of a downcomer in a vessel; contacting liquid with a shell of the vessel or an outer wall of the downcomer adjacent to a shell of the vessel while descending in the downcomer directing liquid from an outlet of the downcomer into a contacting volume; entraining the liquid in the vapor ascending in the contacting volume to flow co-currently into a demister; and separating the liquid from the vapor in the demister. An embodiment of the invention is one, any or all of prior embodiments in this paragraph up through the third embodiment in this paragraph further comprising passing a separated liquid stream from the demister onto a transport deck. An embodiment of the invention is one, any or all of prior embodiments in this paragraph up through the third embodiment in this paragraph further comprising cross-contacting the liquid on the transport deck with vapor passing through perforations on the deck from an inferior stage. An embodiment of the invention is one, any or all of prior embodiments in this paragraph up through the third embodiment in this paragraph wherein the liquid directed through the inlet of the downcomer is from a superior receiving deck.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for vapor-liquid contacting, comprising the steps of:
   directing a liquid through an inlet of a downcomer in a vessel;
   contacting the liquid with a shell of the vessel or an outer wall of the downcomer adjacent to the shell of the vessel while descending in said downcomer;
   directing the liquid from an outlet of the downcomer into a contacting volume;
   entraining the liquid in a first portion of a vapor ascending in said contacting volume to flow co-currently into a demister;
   separating the liquid from the first portion of the vapor in the demister to provide a separated liquid; and
   passing the separated liquid from the demister onto a transport deck having a plurality of perforations,
   wherein only the first portion of the vapor flows up passed the transport deck through the demister and a second portion of the vapor flows up passed the transport deck through the plurality of perforations,
   wherein the first portion of the vapor is prohibited from flowing up passed the transport deck through the plurality of perforations, and
   wherein the second portion of the vapor is prohibited from flowing up passed the transport deck through the demister.

2. The process of claim 1 wherein the liquid directed through the inlet of said downcomer is from a superior receiving deck.

3. The process of claim 1 further comprising cross-contacting the separated liquid on the transport deck with the second portion of the vapor passing through perforations on the transport deck from an inferior stage.

* * * * *